United States Patent [19]

Cipolli et al.

[11] Patent Number: 5,606,011
[45] Date of Patent: Feb. 25, 1997

[54] MELAMINIC POLYCONDENSATES

[75] Inventors: Roberto Cipolli, Novara; Roberto Oriani, Milan; Enrico Masarati, Castelnuovo Valtidone; Gilberto Nucida, San Giuliano Milanese, all of Italy

[73] Assignee: Ministero Dell'Universita' e Della Ricerca Scientifica e Tecnologica, Rome, Italy

[21] Appl. No.: 199,961

[22] Filed: Feb. 22, 1994

Related U.S. Application Data

[63] Continuation of Ser. No. 976,455, Nov. 13, 1992, abandoned.

[30] Foreign Application Priority Data

Nov. 14, 1991 [IT] Italy .................. MI91A3044

[51] Int. Cl.$^6$ .............. C08G 10/02; C08G 12/02
[52] U.S. Cl. .............. 528/243; 528/230; 528/492; 528/493; 525/150; 525/158
[58] Field of Search .................. 525/150, 158; 528/230, 243, 492, 493

[56] References Cited

U.S. PATENT DOCUMENTS 2,339,622  1/1944  D'Alelio .
2,524,727 10/1950  Dudley ..................... 528/230
2,544,071  3/1951  Dudley .

FOREIGN PATENT DOCUMENTS

0415371A2  6/1991  European Pat. Off. ........... 528/230
0448774   10/1991  European Pat. Off. .

*Primary Examiner*—James J. Seidleck
*Assistant Examiner*—Duc Truong
*Attorney, Agent, or Firm*—Oblon, Spivak, McClelland, Maier & Neustadt, P.C.

[57] ABSTRACT

Condensation compounds obtained by means of the polymerization of polyaminic compositions essentially constituted by derivatives of 2,4,6-triamino-1,3,5-triazine, having the general formula (I):

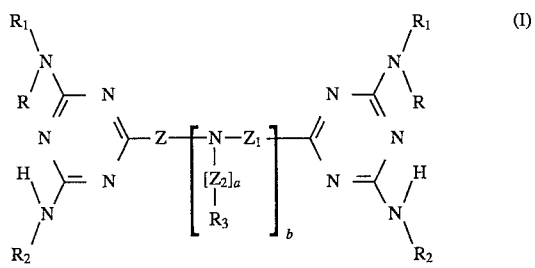

with aldehydes, preferably formaldehyde.

9 Claims, No Drawings

MELAMINIC POLYCONDENSATES

This application is a Continuation of U.S. patent application Ser. No. 07/976,455, filed on Nov. 13, 1992, now abandoned.

The present invention relates to compounds obtained by means of polycondensation of polyaminic compositions, essentially constituted by metaminic derivatives, with aldehydes.

More particularly, the present invention relates to compounds of polycondensation with aldehydes, preferably formaldehyde, of derivatives of 2,4,6-triamino-1,3,5-triazine.

These compounds are used in the preparation of self-extinguishing polymeric compositions, based on thermoplastic polymers, or polymers endowed with elastomeric properties, in particular olefinic polymers or copolymers, in combination with ammonium or amine phosphates and/or phosphonates.

In particular, the subject matter of the present invention are the aminoplastic resins obtained by means of the polymerization of a mixture comprising:

(1) from 0 to 50 parts by weight of one or more polyaminic derivatives;
(2) from 50 to 100 parts by weight of one or more derivatives of 2,4,6-triamino-1,3,5-triazine having the general formula (I):

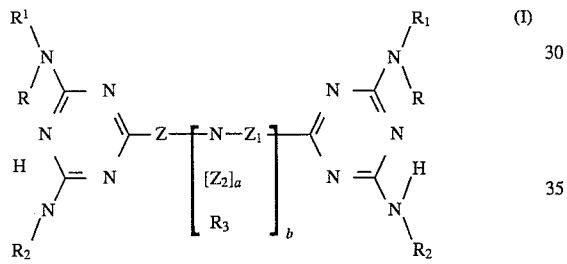

with formaldehyde or a mixture of formaldehyde and an aldehyde having the general formula (II):

$$R_4\text{—CHO} \qquad (II)$$

wherein the aldehyde having the general formula (II) can be present in an amount of up to 20% by mol, and wherein: the radicals from R to $R_2$, which may be the same, or different from each other, and may have different meanings on each triazinic ring, are: H; $C_1$–$C_{18}$ alkyl; $C_2$–$C_8$ alkenyl; $C_6$–$C_{16}$ cycloalkyl or alkylcycloalkyl, possibly substituted with a hydroxy or $C_1$–$C_4$ hydroxyalkyl function;

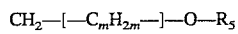

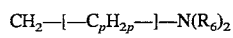

wherein:
m=an integer comprised within the range of from 1 to 7;
p=an integer comprised within the range of from 1 to 5;
$R_5$=H; $C_1$–$C_8$ alkyl; $C_2$–$C_6$ alkenyl; –[$C_qH_{2q}$]–O–$R_7$ wherein q is an integer comprised within the range of from 1 to 4 and $R_7$ is H or $C_1$–$C_4$ alkyl; $C_6$–$C_{12}$ cycloalkyl or alkylcycloalkyl;
the radicals $R_6$, which may be the same, or different from each other, are: H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

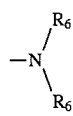

is replaced by a heterocyclic radical linked to the alkyl chain through the nitrogen atom, and possibly containing another heteroatom preferably selected from O, S, N; or in the general formula (I) the moiety:

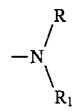

is replaced by a heterocyclic radical linked to the triazinic ring through the nitrogen atom, and possibly containing another heteroatom preferably selected from O, S, N;

a is 0 (zero) or 1;
b is 0 (zero) or an integer comprised within the range of from 1 to 5;
$R_3$ is hydrogen or:

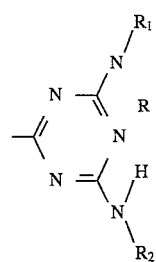

and its meaning may vary within each repeating unit; when b is 0 (zero), Z is a divalent radical falling within the scope of one of the following formulas:

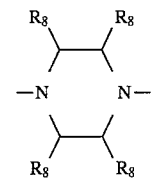

wherein the radicals $R_8$, which may be the same or different from each other, are hydrogen or $C_1$–$C_4$ alkyl;

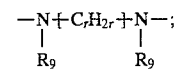

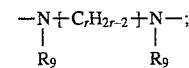

wherein r is an integer comprised within the range of from 2 to 14; $R_9$ is hydrogen; $C_1$–$C_4$ alkyl; $C_2$–$C_6$ alkenyl; $C_1$–$C_4$ hydroxyalkyl;

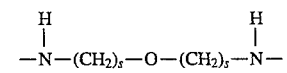

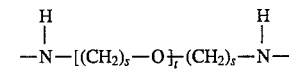

wherein s is an integer comprised within the range of from 2 to 5 and t is an integer comprised within the range of from 1 to 3;

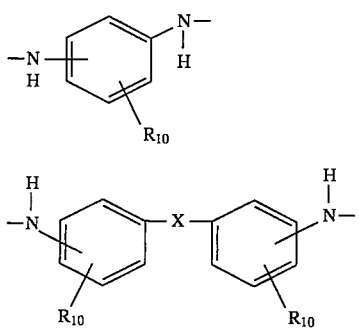

(VIII)

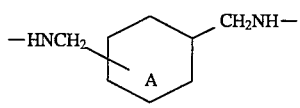

(IX)

wherein:

X is a direct C—C bond; O; S; S—S; SO; SO$_2$; NH; NHSO$_2$; NHCO; N=N; CH$_2$;

R$_{10}$ is hydrogen; hydroxy; C$_1$–C$_4$ alkyl; C$_1$–C$_4$ alkoxy;

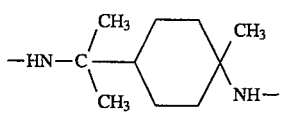

(X)

wherein A may be a saturated or unsaturated ring;

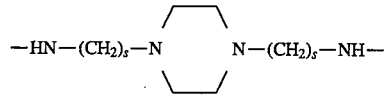

(XI)

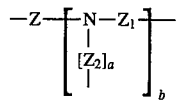

(XII)

wherein s has the above defined meaning; when, on the contrary, b is an integer comprised within the range of from 1 to 5, the moiety:

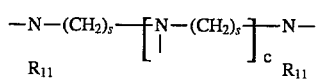

is a multivalent moiety falling within the scope of one of the following formulas:

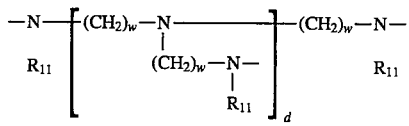

(XIII)

wherein:

R$_{11}$ is hydrogen or C$_1$–C$_4$ alkyl;

c is an integer comprised within the range of from 1 to 5; the indexes s, which may be the same, or different from each other, have the same meaning as defined hereinabove;

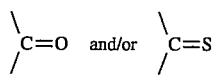

(XIV)

wherein:

R$_{11}$ has the meaning as defined hereinabove;

w is an integer comprised within the range of from 2 to 4;

d is either 1 or 2.

R$_4$ is C$_1$–C$_8$ alkyl; C$_2$–C$_6$ alkenyl; C$_6$–C$_{12}$ cycloalkyl; C$_6$–C$_{12}$ aryl, possibly substituted with one or more C$_1$–C$_4$ alkyl radicals; C$_7$–C$_{16}$ aralkyl; C$_8$–C$_{12}$ aralkenyl.

According to a preferred form of practical embodiment of the aminoplastic resins according to the present invention, the polyaminic derivative is selected from compounds containing the 1,3,5-triazine ring, or at least one $$\diagdown \atop \diagup C = O \quad \text{and/or} \quad \diagdown \atop \diagup C = S$$

moiety.

Also those derivatives having an asymmetrical structure, in the sense that the radicals R, R$_1$ and R$_2$ may have different meanings on each triazinic ring, fall within the scope of general formula (I).

Examples of radicals from R to R$_3$ in general formula (I) are: methyl; ethyl; propyl; isopropyl; n-butyl; isobutyl; tert-butyl; n-pentyl; isopentyl; n-hexyl; tert-hexyl; octyl; tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyhexyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyhexyl; 7-methoxyheptyl; 7-methoxyoctyl; 2-ethoxyethyl; 3-ethoxypropyl; 4-ethoxybutyl; 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino)ethyl; 3-(N,N-dimethylamino)propyl; 4-(N,N-dimethylamino)butyl; 5-(N,N-dimethylamino)pentyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 4-(N,N-dipropylamino)butyl; 2-(N,N-diisopropylamino) ethyl; 6-(N-hexenylamino)hexyl; 2-(N-ethenylamino) ethyl; 2-(N-cyclohexylamino)ethyl; 2-(N-2-hydroxyethylamino) ethyl; 2-(2-hydroxyethoxy)ethyl; 2-(2-methoxyethoxy)ethyl; 6-(N-propylamino)hexyl; and so forth.

Examples of heterocyclic radicals which may replace the moiety:

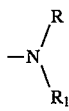

in general formula (I) are: aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which may replace the moiety:

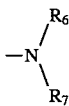

are: aziridine; pyrrolidine; piperidine; morpholine; thiomorpholine; piperazine; 4-methylpiperazine; 4-ethylpiperazine; and so forth.

Examples of divalent —Z— radicals are those which derive, by elimination of a hydrogen atom from each aminic moiety, from the following diaminic compounds: piperazine; 2-methyl piperazine; 2,5-dimethylpiperazine; 2,3,5,6-tetramethyl piperazine; 2-ethylpiperazine; 2,5-diethyl piperazine; 1,2-diaminoethane; 1,3-diaminopropane; 1,4-diaminobutane; 1,5-diaminopentane; 1,6-diaminohexane; 1,8-diaminooctane; 1,10-diaminodecane; 1,12-diaminododecane; N,N-dimethyl-1,2-diaminoethane; N-methyl-1,3-diaminopropane; N-ethyl-1,2-diaminoethane; N-isopropyl-1,2-diaminoethane; N-(2-hydroxyethyl)-1,2-diaminoethane; N,N'-bis(2-hydroxy -ethyl)-1,2-diaminoethane; N-(2-hydroxyethyl)-1,3-diaminopropane; N-hexenyl-1,6-diaminohexane; N,N'-diethyl-1,4-diamino-2-butene; 2,5-diamino-3-hexene; 2-ether; (2-aminoethoxy)methylether; 1,2-bis(2-aminoethoxy)ethane; 1,3-diaminobenzene; 1,4-diaminobenzene; 2,4-diaminotoluene; 2,4-diaminoanisole; 2,4-diaminophenol; 4-aminophenylether; 4,4'-methylenedianiline; 4,4'-diaminobenzanilide; 3-aminophenylsulfone; 4-aminophenylsulfone; 4-aminophenylsulfoxide; 4-aminophenyldisulfide; 1,3-bis(aminomethyl)benzene; 1,4-bis(aminomethyl)benzene; 1,3-bis(aminomethyl)cyclohexane; 1,8-diamino-p-mentane; 1,4-bis(2-aminoethyl)piperazine; 1,4-bis(3-aminopropyl)piperazine; 1,4-bis(4-aminobutyl)piperazine; 1,4-bis(5-aminopentyl)piperazine; and so forth.

Examples of multivalent radicals:

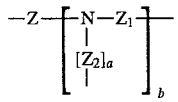

are those which derive, by elimination of a hydrogen atom from each reacted amino group, from the following polyaminic compounds: bis(2-aminoethyl)amine; bis(3-aminopropyl)amine; bis(4-aminobutyl)amine; bis(5-aminopentyl)amine; bis[2-(N-methylamino)ethyl]amine; 2-N-butyl-bis (2-aminoethyl)amine; bis[3-(N-methylamino)propyl] amine; N-(3-aminopropyl)-1,4-diamonobutane; N-(3-aminopropyl)-1,5-diaminopentane; N-(4-aminobutyl)-1,5-diaminopentane; tris(2-aminoethyl)amine; tris(3-aminopropyl)amine; tris(4-aminobutyl)amine; tris [2-(N-ethylamino)ethyl]amine; N,N'-bis(2-aminoethyl)-1,2-diaminoethane; N,N'-bis(3-aminopropyl)-1,3-diaminopropane; N,N'-bis(2-aminoethyl)-1,3-diaminopropane; N,N'-bis(3-aminopropyl)-1,2diaminoethane; N,N'-bis(3-aminopropyl)-1,4diaminobutane; bis[2-(2-aminoethyl)aminoethyl]amine; N,N'-bis[2-(2-aminoethyl)aminoethyl]-1,2-diaminoethane; N,N'-bis[3-(2-aminoethyl)aminopropyl ]-1,2-diaminoethane; N,N,N',N'-tetrakis(2-aminoethyl)-1,2-diaminoethane; and so forth.

By "formaldehyde", as this term is used in the instant disclosure and in the appended claims, any forms are meant, in which formaldehyde is usually marketed: aqueous solution, metaformaldehyde, paraformaldehyde.

Examples of $R_4$ radical in general formula (II) are: methyl; ethyl; n-propyl; isopropyl; n-butyl; isobutyl; tert-butyl; n-pentyl; isopentyl; n-hexyl; n-heptyl; isoheptyl; n-octyl; ethenyl; propenyl; isobutenyl; sec-butenyl; n-pentenyl; cyclohexyl; phenyl; 2-methylphenyl; 3-methylphenyl; 4-methylphenyl; 4-isopropylphenyl; 2,4,6-trimethylphenyl; 1-phenylethyl; 2-phenylethyl; 2-phenylethenyl; and so forth.

Examples of polyaminic derivatives are: urea; ethyleneurea; propyleneurea; thiourea; ethylenethiourea; melamine; acetoguanamine; propionoguanamine; butyroguanamine; isobutyroguanamine; caprinoguanamine; succinoguanamine; benzoguanamine; metamethylbenzoguanamine; benzylguanamine; hydantoin; piperazine-2,5-dione; barbituric acid; and so forth.

The aminoplastic resins according to the present invention can be synthetized as follows:

(a) by reacting in a suitable solvent (such as, e.g., water, methyl alcohol, ethyl alcohol, or their mixtures, and so forth), the derivative of 2,4,6-triamino-1,3,5-triazine having the general formula (I), either mixed or not mixed with the polyaminic derivative, with formaldehyde or a mixture of formaldehyde and an aldehyde of general formula (II). The molar ratio of the derivative of general formula (I), or of its mixture with the polyaminic derivative, to formaldehyde, or to the mixture of formaldehyde with the aldehyde of general formula (II), is comprised within the range of from 1:1 to 1:12.

The reaction is carried out at a pH value comprised within the range of from 7 to 12, possibly obtained by adding an alkali (such as, for example, potassium carbonate, sodium carbonate, sodium hydroxide, and so forth), at temperatures comprised within the range of from 20° C. the boiling point of the solvent, until a finely subdivided dispersion is obtained;

(b) causing the resulting reaction product, constituted by the alkylol derivative, to turn into a resin by acidifying it to a pH value comprised within the range of from 1 to 5, by means of the addition of an acid (such as, e.g., sulfuric acid, hydrochloric acid, phosphoric acid, and so forth) and heating it to a temperature comprised within the range of from 40° C. to the boiling point of the solvent. The resulting dispersion is kept further stirred at the selected temperature, during the necessary time to complete the resinification process, preferably of from 1 to 12 hours. The residual acidity of the resulting mixture is then neutralized with a base selected from those as suggested hereinabove, and the resulting product is filtered off.

The resin is first dried at 100° C., then is submitted to thermal treatment for some hours, preferably from 1 to 3 hours, in a vacuum oven at 150° C.

In general good quality aminoplastic resins are obtained as white crystalline powders, which are insoluble in water and can be used in self-extinguishing polymeric compositions without any further purification.

An alternative synthesis method consists in causing the reactions of the above (a) and (b) steps to take place in one single step, at a pH value comprised within the range of from 1 to 5, and at a higher temperature than 40° C.

Many of derivatives of 2,4,6-triamino-1,3,5-triazine of general formula (I) are known; they can anyway be easily synthetized according to as disclosed in European Patent application publication No. 415 371, to the same Applicant's name.

Condensation compounds obtained by means of the polymerization with aldehydes, preferably formaldehyde, of the melaminic derivatives of general formula (I), either containing, or not containing, polyaminic derivatives, not cited in the Examples, are those as reported in Table 1, in which $R_3$, when present, is substituted by the triazinic ring of formula:

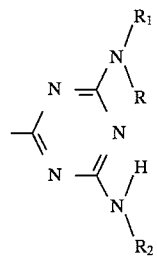

TABLE 1

| COMPOUND No | Derivative of general formula (I) R—N—R₁ | R₂ | $-Z-\left[-N-Z_1\atop[Z_2]_a\right]_b-$ | Polyaminic derivative Designation | % by weight | R₄—CHO R₄ | mol % | Molar ratio polyamines/aldehydes |
|---|---|---|---|---|---|---|---|---|
| 1 | cyclohexyl, H | H | piperazine (N—N ring) | — | — | — | — | 1:4 |
| 2 | morpholine | H | phenylenediamine (—NH—C₆H₄—NH—) | — | — | — | — | 1:3,5 |
| 3 | H, H | H | —N(CH₃)CH₂CH(CH₃)—N— | Benzoguanamine | 20 | — | — | 1:2,5 |
| 4 | (CH₂)₂OCH₃ | (CH₂)₂OCH₃ | —HN(CH₂)₃NH— | — | — | — | — | 1:2 |
| 5 | N-methylpiperazine | H | piperazine (N—N ring) | — | — | C₂H₅ | 10 | 1:5 |
| 6 | (CH₂)₅OH | H | piperazine (N—N ring) | Ethyleneurea | 25 | — | — | 1:2 |
| 7 | (CH₂)₃OCH₃ | (CH₂)₃OCH₃ | —NCH₂CH₂N—, CH₃, CH₃ | — | — | — | — | 1:4 |
| 8 | morpholine | H | —HN(CH₂)₃N[piperidine N(CH₂)₃NH—]HN(CH₂)₃N— | — | — | — | — | 1:4 |

TABLE 1-continued

| COMPOUND No | Derivative of general formula (I) | | | Polyaminic derivative | | $R_4$—CHO | | Molar ratio polyamines/aldehydes |
|---|---|---|---|---|---|---|---|---|
| | R—N—$R_1$ | $R_2$ | $-Z-\left[\underset{[Z_2]_a}{N-Z_1}\right]_b-$ | Designation | % by weight | $R_4$ | mol % | |
| 9 |  | H |  | — | — | — | — | 1:4 |
| 10 |  | H | —HN(CH$_2$CH$_2$O)$_2$—CH$_2$CH$_2$NH— | — | — | — | — | 1:2,5 |
| 11 | (CH$_2$)$_2$OCH$_3$ | H | —HNC$_2$H$_4$—N—C$_2$H$_4$NH— | Acetoguanamine | 30 | — | — | 1:6 |
| 12 |  | H | —HNCH$_2$CH$_2$NH— | — | — | — | — | 1:3,5 |
| 13 |  | H |  | — | — | i-C$_4$H$_9$ | 8 | 1:6 |
| 14 | CH$_2$CH$_2$OH | H |  | — | — | — | — | 1:5 |
| 15 | CH$_2$CH$_2$OCH$_3$ | H | —HN(CH$_2$)$_4$NH— | Melamine | 40 | — | — | 1:4 |
| 16 |  | H | —HNCH$_2$CH$_2$NH— | — | — | — | — | 1:8 |
| 17 | H | H | N(CH$_2$CH$_2$NH—)$_3$ | — | — | — | — | 1:8 |

TABLE 1-continued

| COMPOUND No | Derivative of general formula (I) | | | | Polyaminic derivative | | $R_4$—CHO | | Molar ratio polyamines/aldehydes |
|---|---|---|---|---|---|---|---|---|---|
| | R—N—R$_1$ | | R$_2$ | $-Z-[-N-Z_1-]_b$ $[Z_2]_a$ | Designation | % by weight | R$_4$ | mol % | |
| 18 | H | H | H | ⟨N—⟩⟨—N—⟩ | Benzylguanamine | 35 | — | — | 1:3,5 |
| 19 | morpholinyl | | H | ⟨N—⟩⟨—N—⟩ | — | — | n-C$_4$H$_9$ | 5 | 1:2,5 |
| 20 | H | H | H | ⟨N—⟩⟨—N—⟩ | Melamine | 20 | i-C$_3$H$_7$ | 8 | 1:3 |
| 21 | pyrrolidinyl | | H | —HNCH$_2$CH$_2$NH— | — | — | — | — | 1:4 |
| 22 | H | H | H | —HNC$_2$H$_4$—N—C$_2$H$_4$NH— | Piperazione-2,5-dione | 20 | — | — | 1:8 |
| 23 | morpholinyl | | H | ⟨N—⟩⟨—N—⟩ | Succinoguanamine | 18 | — | — | 1:4,5 |
| 24 | n-C$_4$H$_9$ | n-C$_4$H$_9$ | n-C$_4$H$_9$ | ⟨N—⟩⟨—N—⟩ | — | — | — | — | 1:4 |

The Examples disclosed in the following illustrate the features of the invention without limiting them.

Example 1

184.5 g of cyanuric chloride and 1300 cm³ of methylene chloride are charged to a reactor of 3 liters of capacity, equipped with stirring means, thermometer, addition funnel, refluxing condenser and cooling bath.

With cooling from the outside, 75 g of 2-methoxy ethylamine and 40 g of sodium hydroxide dissolved in 150 cm³ of water are added simultaneously, within a 3 hour time, with the pH value of the mixture being kept comprised within the range of from 5 to 7, and the temperature being kept comprised within the range of from 0° to 3° C.

The reaction mixture is kept at said temperature of 0°–3° C. for a further 3 hours, then the aqueous phase is separated.

The organic solution is treated with two portions of 200 cm³ each, of water, with the aqueous phase being separated each time.

By distillation of methylene chloride, 217 g of intermediate (XV):

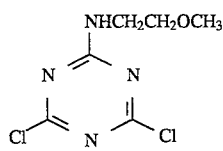

are obtained as a white crystalline powder with m.p.= 73°–75° C. (m.p.=melting point) and a chlorine content of 31.68% (theoretical chlorine content: 31.84%).

400 cm³ of acetone and 133.8 of intermediate (XV) are charged to a reactor of 1 liter of capacity equipped with stirring means, thermometer, addition funnel, refluxing condenser and heating bath.

The reaction mixture is heated up to 40° C. with stirring, until a solution is obtained, then, with the temperature being kept constant at 40° C., 102 g of an aqueous solution of ammonia at 30% by weight are added during a 30 minute time.

The reaction mixture is subsequently heated up to 5° C., and is kept 4 hours at that temperature.

After cooling down to 10° C., the resulting product is filtered off and is washed on the same filter with cold water.

After oven-drying at 100° C., 114 g of intermediate (XVI):

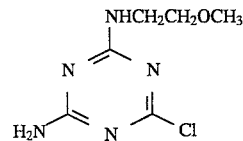

are obtained as a white cristalline powder having m.p.= 195°–197° C., and a chlorine content of 17.18% (theoretical chlorine content: 17.44%).

500 cm³ of xylene, 81.4 g of intermediate (XVI) and 17.2 g of piperazine are charged to the same reactor of 1 liter of capacity.

The resulting mixture is heated up to 100° C. and is kept 2 hours at that temperature.

Then, 16 g of sodium hydroxide are added and the temperature of the reaction mixture is increased up to boiling temperature. The reaction mixture is kept refluxing for approximately 20 hours, then is cooled down to room temperature, and the resulting precipitate is filtered off.

The filter cake is washed with a plentiful water and is dried.

74.2 g of intermediate (XVII):

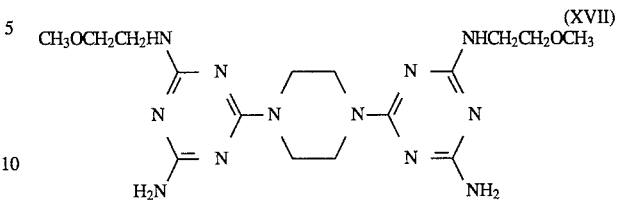

with m.p.=212°–215° C. are obtained.

The structure of intermediates (XV), (XVI) and (XVII) was confirmed by I.R. spectroscopic analysis.

450 cm³ of water, 64.8 g of an aqueous solution at 37% by weight of formaldehyde, 0.7 g of sodium carbonate and, with stirring, 84.0 g of intermediate (XVII) are charged to the same reactor of one liter of capacity.

The reaction mass is heated up to 70° C., and is kept stirred at that temperature for five hours.

Then, 3.0 g of sulfuric acid diluted with 10 cm³ of water are added.

The reaction mass is heated up to boiling temperature, and is kept under refluxing conditions for five hours.

Then, 200 cm³ of water are added, with the temperature of the reaction mixture being allowed to decrease down to 60° C., and the reaction mixture is subsequently neutralized by means of the addition of 2.4 g of sodium carbonate.

The reaction mixture is kept at 60° C. for one further hour, then the resulting product is filtered off, and the filter cake is washed on the same filter with hot water.

By oven drying the filter cake at 100° C. and subsequently submitting it to a thermal treatment at 150° C. for 2 hours, under vacuum, 92.2 g of resin are obtained as a crystaline powder of white colour, having a higher melting point than 300° C.

Example 2

184.5 g of cyanuric chloride and 1300 cm³ of methylene chloride are charged to the same equipment of 3 liters of capacity as disclosed in Example 1.

Then, by proceeding as disclosed in Example 1, but using 87.2 g of morpholine, 230 g of intermediate (XVIII):

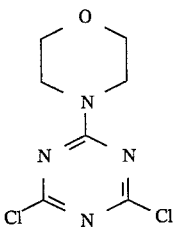

are obtained as a white crystalline powder with m.p.= 155°–157° C. and a chlorine content of 29.87% (theoretical value: 30.12%).

100 g of a solution at 30% by weight of ammonia
100 cm³ of water and 70.5 g of intermediate (XVIII) are charged to a reactor of 0.5 liter of capacity, equipped as in Example 1.

The reaction mixture is heated up to 50° C. and is kept 7 hours at this temperature; then, the reaction mixture is allowed to cool down to room temperature, the obtained product is filtered off and the filter cake is washed with water.

By drying the filter cake, 58 g of intermediate (XIX):

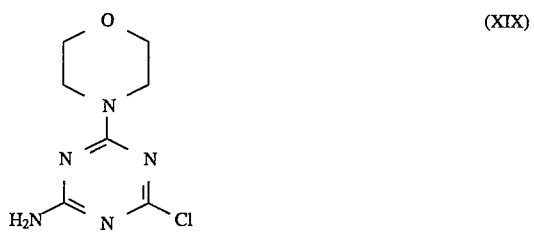
(XIX)

are obtained as a white crystalline powder with m.p.= 189°–191° C. and a chlorine content of 16.28% (theoretical value: 16.47%).

400 cm³ of ortho-dichlorobenzene, 53.9 g of intermediate (XIX) and 14.5 g of hexamethylenediamine are added to a reactor of 1 liter of capacity, fitted as the one disclosed hereinabove.

The resulting mixture is heated up to 100° C., and is kept 2 hours at that temperature. Then, 10 g of sodium hydroxide are added and the resulting mixture is heated up to 140° C. The reaction mixture is kept 16 hours at 140° C., then is cooled down to room temperature and the resulting product is filtered off and the filter cake is washed with plentiful water.

After drying, 53.0 g of intermediate (XX):

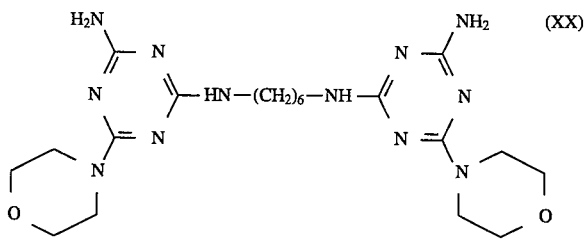
(XX)

are obtained as a white cristalline powder having m.p.= 267°–269° C.

The structure of compounds (XVIII), (XIX) and (XX) was confirmed by I.R. spectroscopic analysis.

400 cm³ of water, 50.7 g of an aqueous solution at 37% by weight of formaldehyde, 0.5 g of sodium carbonate and, with stirring, 59.2 g of intermediate (XX) are charged to the same reactor of one liter of capacity.

The reaction mass is heated up to 65° C., and is kept stirred at that temperature for 4 hours.

Then, 3.0 g of sulfuric acid are added, the reaction mass is heated up to boiling temperature, and is kept under refluxing conditions for 4 hours.

Then, 200 cm³ of water are added, with the reaction temperature being allowed to decrease down to 50° C., and the reaction mixture is subsequently neutralized by means of the addition of 2.6 g of sodium carbonate.

Then, by proceeding as disclosed in Example 1, 64.1 g of resin are obtained as a crystalline powder of white colour having a melting point higher than 300° C.

Example 3

184.5 g of cyanuric chloride and 800 cm³ of acetone are charged to a reactor of 3 liters of capacity, equipped with stirrer, thermometer, addition funnel, reflux condenser and heating bath.

With stirring, the reaction mixture is heated up to 40° C. in order to obtain a solution, then, with the temperature being kept at 40° C., 284 g of an aqueous solution of ammonia at 30% by weight are added during a 1 hour and 30 minute time.

The reaction mixture is subsequently heated up to 45° C. and is kept 4 hours at this temperature.

After cooling, the resulting product is filtered off and is washed on the filter with water.

After oven drying at 50°–60° C. under vacuum, 113 g of intermediate (XXI):

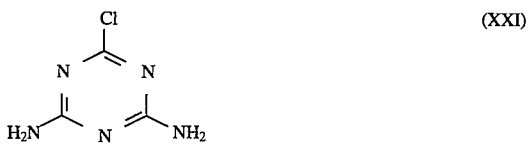
(XXI)

are obtained as a white, infusible, crystalline powder containing 24.2% of chlorine (theoretical chlorine content= 24.4%).

400 cm³ of xylene, 58.2 g of intermediate (XXI) and 17.2 g of piperazine are charged to a reactor of 1 liter of capacity, fitted as the preceding one.

The reaction mass is heated up to 100° C., and is kept 2 hours at this temperature.

Then, 16 g of sodium hydroxide in solid state are added and the resulting mixture is heated up to boiling temperature.

The reaction mixture is allowed to reflux for approximately 20 hours, then is cooled down to room temperature and is filtered.

The filter cake is washed with plentiful water and is dried. 54.2 g of intermediate (XXII):

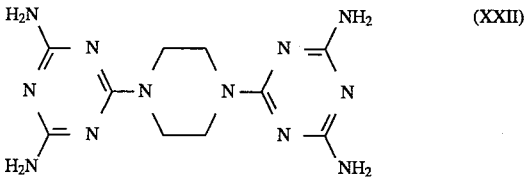
(XXII)

are obtained as a white crystalline powder having a higher m.p. than 300° C.

The structure of compounds (XXI) and (XXII) was confirmed by I.R. spectroscopic analysis.

400 cm³ of water, 0.9 g of potassium carbonate, 2.9 g of an aqueous solution at 37% by weight of formaldehyde and, with stirring, 45.6 g of intermediate (XXII) are charged to the same reactor of one liter of capacity.

The reaction mass is heated up to 70° C., and is kept stirred at that temperature for 6 hours.

Then, 3.0 g of sulfuric acid are added, the reaction mass is heated up to boiling temperature, and is kept under refluxing conditions for 6 hours.

Then, 150 cm³ of water are added, with the reaction temperature being allowed to decrease down to 60° C., and the reaction mixture is subsequently neutralized by means of the addition of 3.1 g of potassium carbonate.

The reaction mixture is kept at 60° C. for a further hour, than the resulting product is filtered off, and the filter cake is washed on the same filter with hot water.

After oven-drying the filter cake at 100° C. and submitting it to thermal treatment, 52,0 g of resin are obtained as a crystalline powder of white colour having a higher m.p. than 300° C.

Example 4

184.5 g of cyanuric chloride and 700 cm³ of water are charged to a reactor of 2 liters of capacity, fitted as in Example 1.

While cooling from the outside, 85 g of piperidine and 40 g of sodium hydroxide dissolved in 150 cm³ of water are fed simultaneously during a 3 hour time, with the pH value of the mixture being kept comprised within the range of from 5 to 7, and the temperature being kept comprised within the range of from 0° to 3° C.

The reaction mixture is kept at the temperature of 0°–3° C. for a further 2 hours, then the resulting product is filtered off and is washed on the filter with water.

600 cm³ of xylene, 96.1 g of intermediate (XXIV) and 15.4 g of diethylene triamine are charged to the same reactor of 1 liter of capacity.

The reaction mixture is heated up to 100° C. and is kept at that temperature for 2 hours. Then, 18 g of sodium hydroxide are added and the resulting mixture is heated up to boiling temperature.

The reaction mass is kept under refluxing conditions for 24 hours, then is cooled down to room temperature, the resulting product is filtered off and the filter cake is washed with water.

By oven-drying at 100° C., 93.1 g of intermediate (XXV):

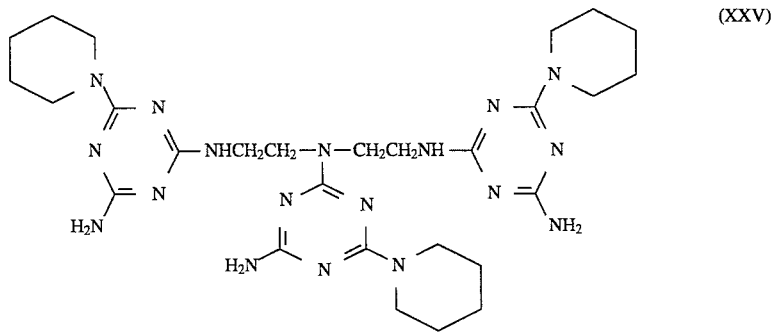

(XXV)

By drying the filter cake in an oven at 50° C., under vacuum, 216.4 g of intermediate (XXIII):

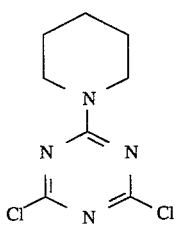

(XXIII)

are obtained as a white crystalline powder with m.p.= 73°–75° C., and a chlorine content of 30.26% (theoretical chlorine content: 30.47%).

200 g of a solution of ammonia at 30% by weight and 500 cm³ of water are charged to a reactor of 1 liter of capacity, fitted as in Example 1.

The reaction mixture is heated up to 40° C. and then, during a 30 minute time, 139.8 g of intermediate (XXIII) are added, with the reaction temperature being kept at 40° C.

The reaction temperature is increased up to 45° C. and is kept at that value for approximately 6 hours.

At the end, the reaction is cooled down to room temperature and the resulting product is filtered off. The filter cake is washed with water and is dried.

123 g of intermediate (XXIV):

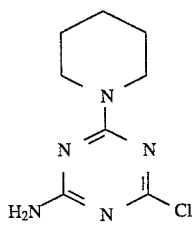

(XXIV)

are obtained as a white crystalline powder having m.p.= 165°–168° C. and containing 16.29% of chlorine (theoretical chlorine content: 16.63%).

The structure of intermediates (XXIII) and (XXIV) was confirmed by NMR analysis.

are obtained as a white crystalline powder with m.p.= 259°–262° C.

The structure of intermediate (XXV) is furthermore confirmed by I.R. spectroscopic analysis.

400 cm³ of water, 64.9 g of solution at 37% by weight of formaldehyde and, with stirring, 63.4 g of intermediate (XXV) are charged to the same reactor of one liter of capacity.

The reaction mixture is heated up to 60° C. and is kept stirred at that temperature for 4 hours.

Then, 3.7 g of an aqueous solution at 37% by weight of hydrochloric acid are added, the reaction mixture is heated up to boiling temperature and is caused to reflux for 6 hours.

Then, 200 cm³ of water are added, the reaction temperature is allowed to decrease down to 50° C. and the mixture is neutralised by means of the addition of 1.5 g of sodium hydroxide.

The reaction mixture is kept for a further hour at 50° C., then the resulting product is filtered off, and the filter cake is washed on the same filter with hot water.

Then, by subsequently proceeding as disclosed in the above Examples, 71.2 g of resin are obtained as a crystalline powder of white colour having a melting point higher than 300° C.

Example 5

600 cm³ of xylene, 107.8 g of intermediate (XIX) and 21.5 g of piperazine are charged to a reactor of one liter of capacity equipped as Example 2.

Then, by proceeding as disclosed in Example 2, 106.1 g of intermediate (XXVI):

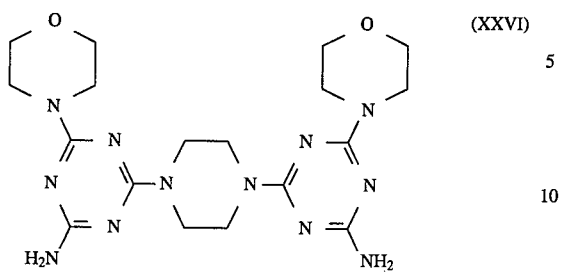

are obtained as a white crystalline powder having melting point=280°–285° C.

The structure of intermediate (XXVI) was confirmed by IR spectroscopic analysis.

150 cm³ of methanol, 100 cm³ of water, 129.7 g of a solution at 37% by weight of formaldehyde and, with stirring, 66.6 g of intermediate (XXVI) and 31.5 g of 2,4,6-triamino-1,3,5-triazine (melamine) are charged to the same reactor of one liter of capacity.

The reaction mixture is heated up to 60° C. and is kept with stirring at that temperature for 4 hours.

Then, 2.9 g of phosphoric acid at 85% by weight diluted with 10 cm³ of water are added, the reaction mixture is heated up to boiling temperature and is kept refluxing for approximately 10 hours.

is filtered off, with the filter cake being washed with plentiful water on the same filter.

After drying the filter cake in an oven at 100° C., 82.6 g of intermediate (XXVII):

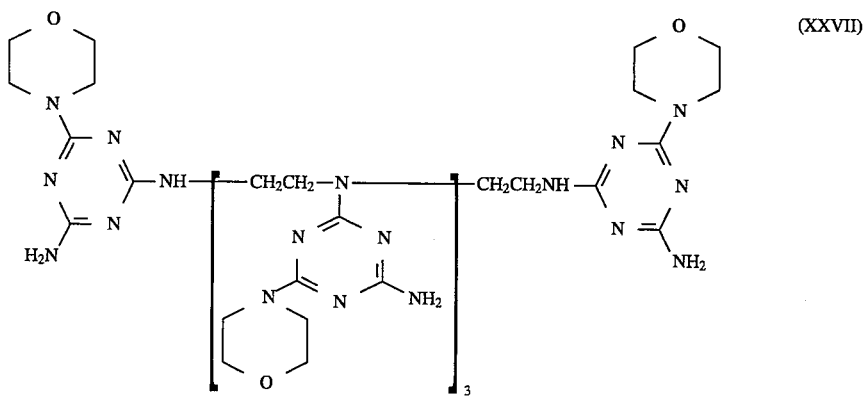

are obtained as a white crystalline powder having melting point=178°–183° C.

The structure of intermediate (XXVII) is also confirmed by IR spectroscopic analysis.

450 cm³ of water, 0.5 g of sodium carbonate, 46.6 g of a solution at 37% by weight of formaldehyde and, with stirring, 54.2 g of intermediate (XXVII) are charged to the same reaction equipment of 1 liter of capacity.

By operating analogously to as disclosed in the preceding Examples, the reaction mixture is heated 4 hours at 60° C., is acidified with 7.9 g of an aqueous solution at 48% by weight of hydrobromic acid and is kept 8 hours under refluxing conditions.

The reaction mixture is then diluted with 200 cm³ of water, is cooled down to 50° C., and is neutralized with 1.5 g of sodium hydroxide.

After filtering off the product, drying the filter cake and carrying out the thermal conditioning of the compound, 67.8 g of resin are obtained as a white crystalline powder having a higher melting point than 300° C.

Then 300 cm³ of water are added, with the temperature being allowed to decrease down to 50° C., and the mixture is neutralized by means of the addition of 4.3 g of potasssium hydroxide.

The reaction mixture is kept at 50° C. for a further hour, then the resulting product is filtered off, and the filter cake is washed on the same filter with hot water.

Then, by proceeding according to the operating modalities as disclosed in the preceding Examples, 112.4 g of resin are obtained as a white crystalline powder, having a melting point higher than 300° C.

Example 6

500 cm³ of xylene, 86.2 g of intermediate (XIX) and 15.1 g of tetraethylenepentaamine are charged to a reactor of one liter of capacity, equipped as in the preceding Examples.

The reaction mixture is heated up to 80° C. and is kept at that temperature for two hours. Then, 16 g of sodium hydroxide are added and the reaction temperature is increased up to 110° C.

The reaction mass is kept at 100° C. for 18 hours, then is cooled down to room temperature, and the resulting product

Example 7

450 cm³ of water, 91.6 g of intermediate (XVI), and, with stirring, 21.9 g of tris(2-aminoethyl)amine are charged to a reactor of 1 liter of capacity, equipped as disclosed in the preceding Examples. The reaction mixture is heated up to 80° C. and is kept at that temperature for 3 hours.

Then 18 g of sodium hydroxide dissolved in 30 cm³ of water are added, and the reaction mixture is heated up to boiling temperature.

The reaction mixture i s caused to reflux for 16 hours, then is cooled down to 10° C., and the resulting product is filtered off, with the filter cake being washed on the same filter with cold water.

By drying the filter cake in an oven at 100° C., 85.4 g of intermediate (XXVIII):

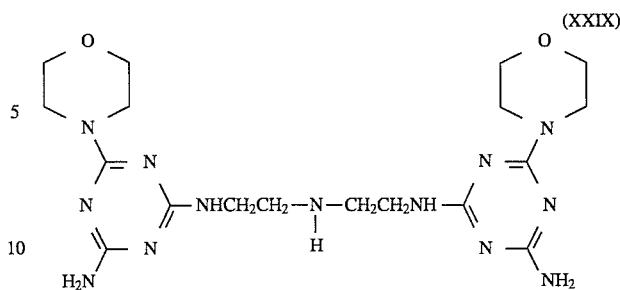

are obtained as a white crystalline powder, having melting point=198°–201° C.

The structure of intermediate (XXIX) was further confermed by IR spectroscopic analysis.

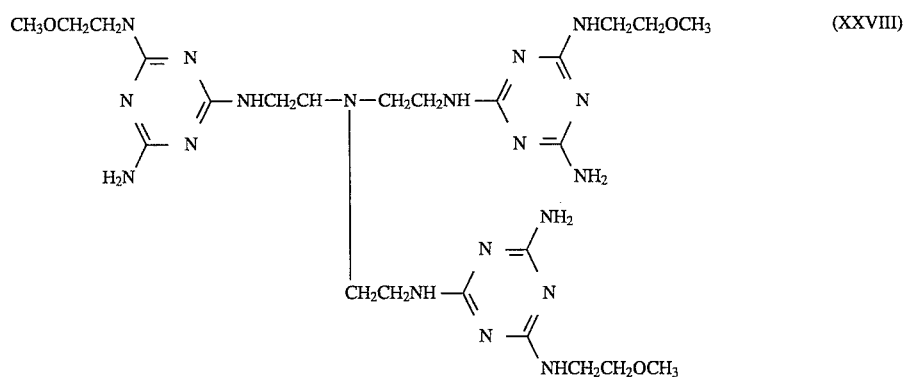

are obtained as a white crystalline powder, having melting point=190°–195° C.

The structure of intermediate (XXVIII) was also confirmed by NMR analysis.

300 cm³ of water, 0.7 g of sodium carbonate, and, with stirring, 24.0 g of paraformaldehyde and 64.7 g of intermediate (XXVIII) are charged to the same reactor of 1 liter of capacity.

The reaction mixture is heated up to 45° C. and is kept at that temperature for 6 hours.

Then, 3.0 g of sulfuric acid at 96% are added, the resulting mixture is heated up to boiling temperature and is caused to reflux for approximately 8 hours.

250 cm³ of water are added, the resulting mixture is cooled down to 45° C. and is neutralized by means of the addition of 2.4 g of sodium carbonate.

Then, by proceeding as disclosed in the preceding Examples, 72.9 g of resin are obtained as a white crystalline powder having a higher m.p. than 300° C.

Example 8

400 cm³ of water, 86.2 g of intermediate (XIX) and 20.6 g of diethylenetriamine are charged to the same equipment of 1 liter of capacity, as of the preceding Example.

The reaction mass is heated at 80° C. for two hours, then 16 g of sodium hydroxide dissolved in 30 cm³ of water are added, and the reaction mixture is heated up to boiling temperature.

The reaction mixture is caused to reflux for approximately 14 hours, then, by proceeding as disclosed in the preceding Example, 86,2 g of intermediate (XXIX):

350 cm³ of water, 77.9 g of a solution at 37% by weight of formaldehyde and, with stirring, 73.8 g of intermediate (XXIX) are charged to the same reactor of 1 liter of capacity.

The reaction mixture is heated up to 50° C. and is kept at that temperature for 3 hours.

The resulting mixture is acidified with 4.1 g of hydrochloric acid at 37% by weight, then is heated up to boiling temperature and is caused to reflux for 4 hours.

Then 250 cm³ of water are added, the resulting mixture is allowed to cool down to 60° C., and is neutralized by means of the addition of 2.2 g of potassium carbonate.

By proceeding as in the preceding Examples, 85.8 g of resin are obtained as a crystalline powder of white colour having a higher melting point than 300° C.

Example 9

184.5 g of cyanuric cloride and 700 cm³ of water are charged to a reactor of 2 liters of capacity, equipped as in Example 4.

With external cooling, 133 g of bis(2-methoxyethyl) amine and 40 g of sodium hydroxide dissolved in 150 cm³ of water are added simultaneously during a 3 hours time, with the pH value of the reaction mixture being kept comprised within the range of from 5 to 7 and the reaction temperature within the range of from 0° to 3° C.

The reaction mixture is kept at the temperature of 0°–3° C. for a further two hours, then the resulting product is filtered off and the filter cake is washed on the filter with cold water.

By oven drying the filter cake at 50° C. under vacuum, 254.3 g of intermediate (XXX):

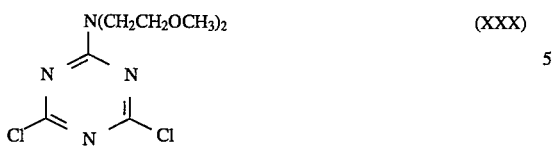

are obtained as a white crystalline powder having melting point=63°–65° C., and containing 25.06% of chlorine (theoretical chlorine content: 25.27%).

200 g of a solution of ammonia at 30% by weight and 500 cm³ of water are charged to a reactor of one liter of capacity, equipped as in the preceding Examples.

The reaction mixture is heated up to 40° C. and then 168.6 g of intermediate (XXX) are added during a minute time, with the reaction temperature being kept at 40° C.

The reaction temperature is increased up to 45° C. and is kept at that value for approximately 6 hours.

At the end, the reaction mixture is cooled down to the temperature of 10° C., the resulting product is filtered off, and the filter cake is washed on the same filter with cold water.

By oven-drying the filter cake, 139.4 g of intermediate (XXXI):

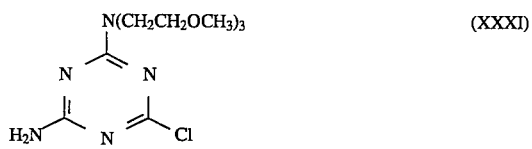

are obtained as a white crystalline powder having melting point=87°–88° C. and containing 13.39% of chlorine (theoretical chlorine content: 13.57%).

The structure of intermediates (XXX) and (XXXI) was further confirmed by NMR analysis.

600 cm³ of xylene, 130.8 g of intermediate (XXXI) and 21.5 g of piperazine are charged to the same reactor of one liter of capacity.

The reaction mixture is heated up to 100° C. and is kept at that temperature for 2 hours. Then, 20 g of sodium hydroxide are added and the resulting mixture is heated up to boiling temperature.

The reaction mixture is caused to reflux for 24 hours, then is cooled down to room temperature, and the resulting product is filtered off, with the filter cake being washed with plentiful water.

By oven-drying at 100° C., 126.1 g of intermediate (XXXII):

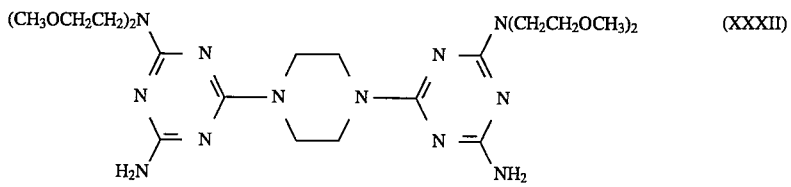

are obtained as a white crystalline powder having melting point=168°–170° C.

The structure of intermediate (XXXII) furthermore confirmed by IR spectroscopic analysis.

350 cm³ of water, 0.5 g of sodium carbonate, 32.5 g of a solution at 37% by weight of formaldehyde and, with stirring, 53.6 g of intermediate (XXXII) are charged to the same reactor of one liter of capacity.

The reaction mass is heated up to 65° C. and is kept hours at that temperature, with stirring.

Then, 3.0 g of sulfuric acid is added, the reaction mixture is heated up to boiling temperature, and is caused to reflux of 5 hours.

250 cm³ of water are added, with the reaction temperature being allowed to decrease down to 50° C. and the resulting mixture is neutralized by means of the addition of 2.6 g of sodium carbonate.

The reaction mixture is kept at 50° C. for a further hour, then the resulting product is filtered off, and the filter cake is washed on the same filter with hot water.

Then, by subsequently proceeding as disclosed in the preceding Examples, 55.1 g of resin are obtained as a white crystalline powder having a melting temperature higher than 300° C.

Examples 10–22

By operating under analogous conditions to as disclosed in Examples from 1 to 9, the resins of melaminic derivatives of general formula (I), either containing, or not containing, polyaminic compounds, as reported in Table 2 and having higher melting points than 300° C. are prepared by polymerization with formaldehyde. In such structures, the radical $R_3$, when present, is replaced by the triazinic ring of formula:

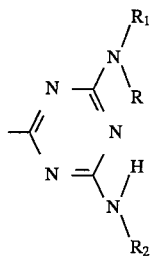

TABLE 2

| EXAMPLE No | Derivative of general formula (I) R—N—R₁ | R₂ | $-Z-\left[\underset{[Z_2]_{la}}{\overset{N-Z_1}{\mid}}\right]_b-$ | Polyaminic derivative Designation | Polyaminic derivative % by weight | R₄ | R₄—CHO Mol % | Molar ratio polyamines/aldehydes |
|---|---|---|---|---|---|---|---|---|
| 10 | ⌬N-S (thiomorpholine) | H | —HNC₂H₄—N—C₂H₄NH— | — | — | — | — | 1:6 |
| 11 | n-C₄H₉ | H | ⌬ N—/N— (piperazine) | — | — | — | — | 1:8 |
| 12 | H | H | —HNCH₂CH₂NH— | — | — | — | — | 1:10 |
| 13 | ⌬N-O (morpholine) | H | ⌬ N—/N— | — | — | — | — | 1:2 |
| 14 | (CH₂)₂OCH=CH₂ | H | ⌬ N—/N— | — | — | — | — | 1:5 |
| 15 | H | H | —HNC₂H₄—N—C₂H₄NH— | — | — | — | — | 1:12 |
| 16 | CH₂CH₂OCH₃ | H | ⌬ N—/N— | Ethyleneurea | 40 | — | — | 1:2 |
| 17 | ⌬N-O (morpholine) | H | cyclohexane with —CH₂NH— and —HNCH₂ substituents | — | — | — | — | 1:4 |
| 18 | (CH₂)₃OCH₃ | H | —HN—C₆H₄—CONH—C₆H₄—NH— | — | — | — | — | 1:4 |

TABLE 2-continued

| EXAMPLE No | Derivative of general formula (I) $-Z-[N-Z_1]_b$ $\phantom{-Z-}[|Z_2|_a]$ | | Polyaminic derivative | | $R_4-CHO$ | | Molar ratio polyamines/aldehydes |
|---|---|---|---|---|---|---|---|
| | $R-N-R_1$ | $R_2$ | Designation | % by weight | $R_4$ | Mol % | |
| 19 | [ring with N, S] | H | $-NCH_2CH_2HN-$ $\phantom{-N}|$ $\phantom{-N}CH_2CH_2OH$ | — | — | — | 1:3.5 |
| 20 | $(CH_2)_2O(CH_2)_2OH$ | H | [piperazine ring N—N] | — | — | — | 1:6 |
| 21 | $CH_2-CH=CH_2$ | H | [piperazine ring N—N] | — | — | — | 1:4 |
| 22 | $CH_2CH_2OCH_3$ | $CH_2CH_2OCH_3$ | melamine [piperazine ring N—N] | 41 | — | — | 1:5 |

Example 23

75 g of isotactic polypropylene flakes, having a Melt Flow Index equal to 12 and containing 96% by weight of insolubles in n-heptane; 5.4 g of the product of Example 3; 21.6 g of ammonium polyphosphate (Exolit 422 ex Hoechst); 0.67 g of dilauryl thiopropionate and 0.33 g of pentaerythritol tetra [3-(3,5-di-tert -butyl-4-hydroxyphenyl-)propionate] are blended and moulded on a MOORE platen press, by operating for 7 minutes at a pressure of 40 kg/cm².

Specimens are obtained as small slabs of approximately 3 mm of thickness, and on them the level of self-extinguishment is determined by measuring the oxygen index (L.O.I. according to ASTM D-2863/77) on a STANTON REDCROFT instrument, and applying the "Vertical Burning Test", which makes it possible the material to be classified at the three levels 94 V-0, 94 V-1 and 94 V-2 according to UL 94 standards (published by "Underwriters Laboratories"—USA).

The following results are obtained:

L.O.I.=36.8

UL 92=Class V-0.

We claim:

1. An aminoplastic resin produced by reacting:

(a) from 0 to 50 parts by weight of one or more polyaminic derivatives;

(b) from 50 to 100 parts by weight of one or more derivatives of 2,4,6-triamino-1,3,5-triazine selected from:

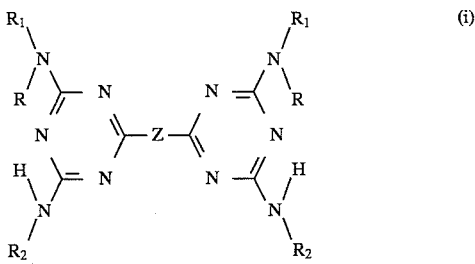

(i)

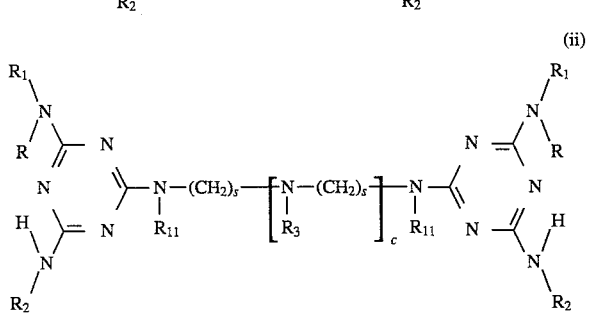

(ii)

or

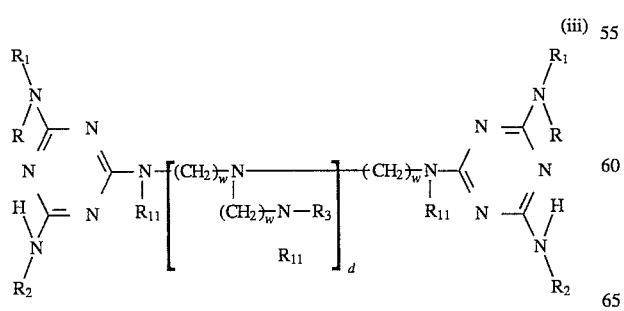

(iii)

with formaldehyde or a mixture of formaldehyde and an aldehyde having the formula (II):

$$R_4\text{—CHO} \qquad (II)$$

wherein the aldehyde having the formula (II) is present in an amount of up to 20% by mol, and wherein:

the radical R which may have different meanings on each triazinic ring is:

$C_{1-18}$ alkyl; $C_2$–$C_8$ alkenyl; $C_6$–$C_{16}$ cycloalkyl, alkylcycloalkyl, unsubstituted or substituted with a hydroxy, or $C_1$–$C_4$ hydroxyalkyl function;

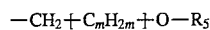

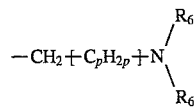

wherein:

m is an integer comprised within the range of from 1 to 7;

p is an integer comprised within the range of from 1 to 5;

$R_5$ is H; $C_1$–$C_8$ alkyl; $C_2$–$C_6$ alkenyl; $\text{—}(C_qH_{2q}\text{—})O\text{—}R_7$ wherein q is an integer comprised within the range of from 1 to 4 and $R_7$ is H or $C_1$–$C_4$ alkyl; $C_6$–$C_{12}$ cycloalkyl or alkylcycloalkyl;

the radicals $R_6$, which may be the same, or different from each other, are:

H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

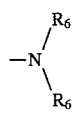

is replaced by a heterocyclic radical linked to the alkyl chain through the nitrogen atom; or the moiety:

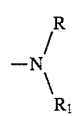

is replaced by a heterocyclic radical linked to the triazinic ring through the nitrogen atom;

the radicals $R_1$ and $R_2$, which may be the same, or different from each other, and may have different meanings on each triazinic ring, are:

H; $C_1$–$C_{18}$ alkyl; $C_2$–$C_8$ alkenyl; $C_6$–$C_{16}$ cycloalkyl, alkylcycloalkyl, unsubstituted or substituted with a hydroxy or $C_1$–$C_4$ hydroxyalkyl function;

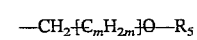

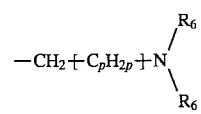

wherein:

m is an integer comprised within the range of from 1 to 7;

p is an integer comprised within the range of from 1 to 5;

$R_5$ is H; $C_1$–$C_8$ alkyl; $C_2$–$C_6$ alkenyl; $\text{—}(C_qH_{2q}\text{—})O\text{—}R_7$ wherein q is an integer comprised within the range of from 1 to 4 and $R_7$ is H or $C_1$–$C_4$ alkyl; $C_6$–$C_{12}$ cycloalkyl or alkylcycloalkyl;

the radicals $R_6$, which may be the same, or different from each other, are:

H, $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the moiety:

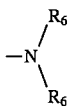

is replaced by a heterocyclic radical linked to the alkyl chain through the nitrogen atom; or the moiety:

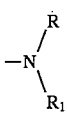

is replaced by a heterocyclic radical linked to the triazinic ring through the nitrogen atom; $R_3$ is hydrogen or:

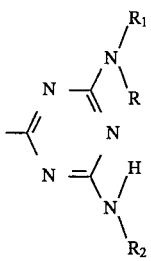

and its meaning may vary within each repeating unit;

Z is a divalent radical falling within the scope of one of the following formulas:

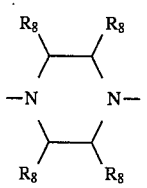 (III)

wherein the radicals $R_8$, which may be the same or different from each other, are hydrogen or $C_1$–$C_4$ alkyl;

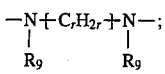 (IV)

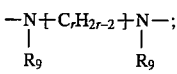 (V)

wherein r is an integer comprised within the range of from 2 to 14; $R_9$ is hydrogen; $C_1$–$C_4$ alkyl; $C_2$–$C_6$ alkenyl; $C_1$–$C_4$ hydroxyalkyl;

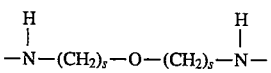 (VI)

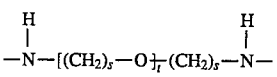 (VII)

where s is an integer comprised within the range of from 2 to 5 and t is an integer comprised within the range of from 1 to 3;

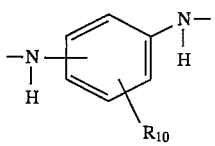 (VIII)

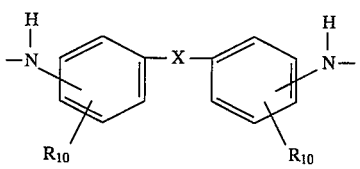 (IX)

wherein:

X is a direct C—C bond; O; S; S—S; SO; $SO_2$; NH; $NHSO_2$; NHCO; N=N; $CH_2$; $R_{10}$ is hydrogen; hydroxy; $C_1$–$C_4$ alkyl; $C_1$–$C_4$ alkoxy;

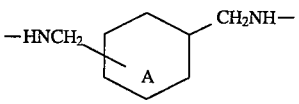 (X)

wherein A may be a saturated or unsaturated ring;

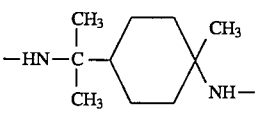 (XI)

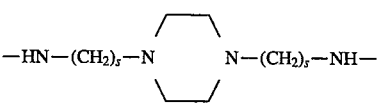 (XII)

wherein s has the above defined meaning;

$R_{11}$ is hydrogen or $C_1$–$C_4$ alkyl;

c is an integer comprised within the range of from 1 to 5;

the indexes s, which may be the same or different from each other, have the above defined meaning;

w is an integer comprised within the range of from 2 to 4;

d is either 1 or 2; and $R_4$ is $C_1$–$C_8$ alkyl; $C_2$–$C_6$ alkenyl; $C_6$–$C_{12}$ cycloalkyl; $C_6$–$C_2$ aryl, or substituted with one or more $C_1$–$C_4$ alkyl radicals; $C_7$–$C_{16}$ aralkyl; $C_8$–$C_{12}$ aralkenyl.

2. A process for preparing the aminoplastic resin according to claim 1, comprising:

(a) reacting
  (i) from 0 to 50 parts by weight of one or more of the polyaminic derivatives and from 50 to 100 parts by weight of the one or more of the 2,4,6-triamino-1,3,5-triazine derivatives with
  (ii) formaldehyde or a mixture of formaldehyde containing up to 20% by mole of the aldehyde $R_4$—CHO; and (b) acidifying to a pH value comprised within the range of from 1 to 5.

3. The process according to claim 2, wherein the ratio of (i) to (ii) is within the range of from 1:1 to 1:12.

4. The process according to claim 2, further comprising using a solvent, and wherein the reacting of (i) and (ii) is carried out within a temperature range of from 20° C. to the boiling point of the solvent, and the acidifying is carried out within a temperature range of from 40° C. to the boiling point of the solvent.

5. The aminoplastic resin of claim 1, in which the polyaminic derivative is selected from compounds containing the 1,3,5-triazine ring, or at least one >C=O and/or >C=S moiety.

6. The aminoplastic resin of claim 15, in which the moiety:

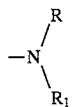

in general formulae (i), (ii), and (iii) is replaced by heterocyclic radicals selected from the group consisting of aziridine; pyrrolidine; piperidine; morpholine; thiomorpholine; piperazine; 4-methylpiperazine; 4-ethylpiperazine; 2-methylpiperazine; 2,5-dimethylpiperazine; 2,3,5,6-tetramethylpiperazine; 2,2,5,5,-tetramethylpiperazine; 2-ethylpiperazine; and 2,5-diethylpiperazine.

7. The aminoplastic resin of claim 1, in which the moiety:

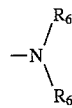

is replaced by a heterocyclic radical selected from the group consisting of aziridine; pyrrolidine; piperidine; morpholine; thiomorpholine; piperazine; 4-methylpiperazine; and 4-ethylpiperazine.

8. The aminoplastic resin of claim 1, in which the polyaminic derivative is selected from the group consisting of urea; ethyleneurea; propyleneurea; thiourea; ethylenethiourea; melamine; acetoguanamine; propionoguanamine; butyroguanamine; isobutyroguanamine; caprinoguanamine; succinoguanamine; benzoguanamine; meta-methylbenzoguanamine; benzylguanamine; hydantoin; piperazine-2,5-dione; and barbituric acid.

9. The aminoplastic resin of claim 1, in which $R_4$ radical is selected from the group consisting of methyl; ethyl; n-propyl; isopropyl; n-butyl; isobutyl; tert-butyl; n-pentyl; isopentyl; n-hexyl; n-heptyl; isoheptyl; n-octyl; ethenyl; propenyl; isobutenyl; sec-butenyl; n-pentenyl; cyclohexyl; phenyl; 2-methyphenyl; 3-methylphenyl; 4-methylphenyl; 4-isopropylphenyl; 2,4,6-trimethylphenyl; 1-phenylethyl; 2-phenylethyl; and 2-phenylethenyl.

* * * * *